US007688384B2

(12) United States Patent
Davis et al.

(10) Patent No.: US 7,688,384 B2
(45) Date of Patent: Mar. 30, 2010

(54) PERSONAL MULTIMEDIA DEVICE VIDEO FORMAT CONVERSION ACROSS MULTIPLE VIDEO FORMATS

(75) Inventors: Robert Davis, Woodbine, MD (US); Kuriacose Joseph, Gaithersburg, MD (US); Ernest Seah, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 11/879,306

(22) Filed: Jul. 17, 2007

(65) Prior Publication Data

US 2007/0277221 A1 Nov. 29, 2007

(51) Int. Cl.
*H04N 11/20* (2006.01)
*H04N 7/16* (2006.01)

(52) U.S. Cl. .................. 348/441; 348/558; 725/152

(58) Field of Classification Search ........... 348/441, 348/459, 554, 558, 443, 701, 14.07, 14.1, 348/14.12; 725/78, 81, 132, 140, 153
See application file for complete search history.

(56) References Cited

U.S. PATENT DOCUMENTS

| | | | |
|---|---|---|---|
| 5,111,292 A | 5/1992 | Kuriacose et al. | 375/240.01 |
| 5,651,104 A * | 7/1997 | Cosman | 345/428 |
| 5,757,967 A * | 5/1998 | Gonzales et al. | 382/233 |
| 5,819,048 A | 10/1998 | Okazaki et al. | 709/233 |
| 5,835,636 A | 11/1998 | Auld | 382/233 |
| 6,037,991 A | 3/2000 | Thro et al. | 725/116 |
| 6,121,978 A * | 9/2000 | Miler | 345/629 |
| 6,124,880 A | 9/2000 | Shafiee | 348/14.08 |
| 6,124,881 A | 9/2000 | Terui et al. | 348/14.09 |
| 6,133,940 A | 10/2000 | Noonen et al. | 348/14.03 |
| 6,215,515 B1 | 4/2001 | Voois et al. | 348/14.01 |
| 6,314,575 B1 | 11/2001 | Billock et al. | 725/87 |
| 6,343,098 B1 | 1/2002 | Boyce | 375/240.03 |
| 6,466,624 B1 * | 10/2002 | Fogg | 375/240.27 |
| 6,529,680 B1 * | 3/2003 | Broberg | 386/83 |
| 6,803,922 B2 | 10/2004 | Marino | 345/603 |
| 6,919,929 B1 | 7/2005 | Iacobelli et al. | 348/589 |
| 6,983,478 B1 | 1/2006 | Grauch et al. | 725/13 |
| 6,984,079 B2 * | 1/2006 | Okada et al. | 400/76 |
| 7,069,573 B1 | 6/2006 | Brooks et al. | 725/62 |
| 7,162,531 B2 * | 1/2007 | Paz et al. | 709/231 |
| 7,209,874 B2 * | 4/2007 | Salmonsen | 703/23 |
| 2002/0059614 A1 * | 5/2002 | Lipsanen et al. | 725/75 |
| 2002/0145611 A1 | 10/2002 | Dye et al. | 345/543 |
| 2002/0154698 A1 | 10/2002 | Youn et al. | 375/240.17 |
| 2002/0174269 A1 * | 11/2002 | Spurgat et al. | 710/1 |
| 2002/0188952 A1 * | 12/2002 | Istvan et al. | 725/95 |
| 2003/0012279 A1 | 1/2003 | Chaddha | 375/240.12 |

(Continued)

*Primary Examiner*—Victor Kostak (57) ABSTRACT

Personal multimedia devices can detect when an incoming video format is different from a native format and make a local decision to convert incoming video formats to a format native to the personal multimedia device. The personal multimedia device may include a media processor that comprises an MPEG decoder/encoder, graphics processors, and a video decoder/encoder. These components increase a frame rate of a received video signal when the frame rate of the received video signal is less than a frame rate of the native video format of the personal multimedia device and decrease the frame rate of the received video signal when the frame rate of the received video signal is greater than the native frame rate of the set-top box. The graphics processor scales a frame resolution of the frames in the received video signal to correspond to the native video format.

29 Claims, 7 Drawing Sheets

U.S. PATENT DOCUMENTS

| | | | |
|---|---|---|---|
| 2003/0188322 A1* | 10/2003 | Bontempi | 725/139 |
| 2003/0206242 A1 | 11/2003 | Choi | 348/411 |
| 2003/0219238 A1 | 11/2003 | Yamaguchi et al. | 386/131 |
| 2004/0239803 A1 | 12/2004 | Selby et al. | 348/459 |
| 2005/0033849 A1 | 2/2005 | Matz | 709/228 |

* cited by examiner

A: odd field
B: even field

PERSONAL MULTIMEDIA DEVICE VIDEO FORMAT CONVERSION ACROSS MULTIPLE VIDEO FORMATS

BACKGROUND OF THE INVENTION

A. Field of the Invention

The present invention relates generally to communications systems, and more particularly, to videoconferencing between entities that use multiple video standards.

B. Description of Related Art

Personal multimedia devices are devices that provide multimedia services to a user. Example of personal multimedia devices include set-top boxes and personal video recording (PVR) devices. A set-top box is a device that enables a television set to receive and decode digital television (DTV) broadcasts. Set-top boxes are frequently used to receive satellite and cable television signals. At a basic level, a set-top box will include an input connection for the television signal broadcast by the satellite or cable company, and an output connection leading to the user's television.

Some set-top boxes additionally include more advanced features, such as a network port (e.g., Ethernet) and/or other input output connections, such as a keyboard or a universal serial bus (USB) connection. With these set-top boxes, in addition to simply watching television, users may perform a number of more interactive activities, such as surfing the web and sending email.

An additional activity that may be performed in conjunction with the more advanced set-top boxes is videoconferencing. More specifically, a video camera may be connected to the set-top box through a connection such as the USB connection. Audio and video recorded by the video camera may be processed by the set-top box and then transmitted through the network port to a network, such as the Internet. At the receiving end, another set-top box may receive the video signal from the network, process the video signal into a format compatible with the receiving television, and present the video signal on the receiving television.

There are situations, however, in which different set-top boxes in the above-described video conferencing scheme are incompatible with one another. Set-top boxes in different regions of the world may use different video formats. Televisions in Europe, for example, typically use the Phase Alternation Line (PAL) analog television display standard while televisions in North America typically use the National Television Systems Committee (NTSC) standard. When attempting to implement a videoconference with televisions using different standards, the received video will not be able to be appropriately displayed on the receiving television.

Therefore, there is a need in the art to improve video conferencing capabilities of personal multimedia devices such as set-top boxes.

SUMMARY OF THE INVENTION

A personal multimedia device, as described herein, converts received video signals to a format native to the device. The device may automatically detect a format of the received video signal. The conversion may be performed by adding or removing frames to the received video signal so that the frame rate of the received video signal is close to that of the native format.

One aspect consistent with the invention is directed to a personal multimedia device that includes a media processing component that increases a frame rate of a received video signal, when the frame rate of the received video signal is less than a frame rate of a native video format of the personal multimedia device by method includes scaling a frame resolution of each of the frames of the video signal in the first format to adjust a resolution of the video signal in the first format to match the resolution of the video signal in the second format.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may adding frames to the received video signal where the added frames are based on at least one of the received frames. Further, the media processing component decreases the frame rate of the received video signal when the frame rate of the received video signal is greater than a native frame rate of the personal multimedia device by removing frames from the received video signal.

Another aspect consistent with the invention is directed to a personal multimedia device that includes a media processing component that detects a frame rate of a received video signal and compares the frame rate to a frame rate native to the personal multimedia device. The media processing component modifies a frame rate of the received video signal when the frame rate of the received video signal is different than the frame rate native to the personal multimedia device by temporally filtering the sequences of frames in the received video signal and also deriving a new set of interpolated frames at the new frame rate.

Another aspect consistent with the invention is directed to a method for converting a compressed video signal in a first format to a second format. The method includes determining a frame rate of the video signal in the first format based on header information included in the compressed video signal and decoding the compressed video signal to uncompress to video signal. The method further includes increasing the frame rate of the video signal in the first format when the determined frame rate is less than a frame rate of the second format by adding frames to the uncompressed video signal of the first format in which each added frame is based on at least one frame in the uncompressed video signal in the first format. Still further, the method includes decreasing the frame rate of the video signal in the first format when the determined frame rate is greater than the frame rate of the second format by removing frames from the uncompressed video signal in the first format. Finally, the identify the same or similar elements. Also, the following detailed description does not limit the invention. Instead, the scope of the invention is defined by the appended claims and equivalents.

A personal multimedia device, as described herein, converts between different video standards to thus facilitate videoconferencing and other streaming video applications across different video transmission standards. The conversion can be performed using standard components of a personal multimedia device such as a set-top box and thus does not add additional cost to the set-top boxes.

Video Conference Overview

Figure 1:
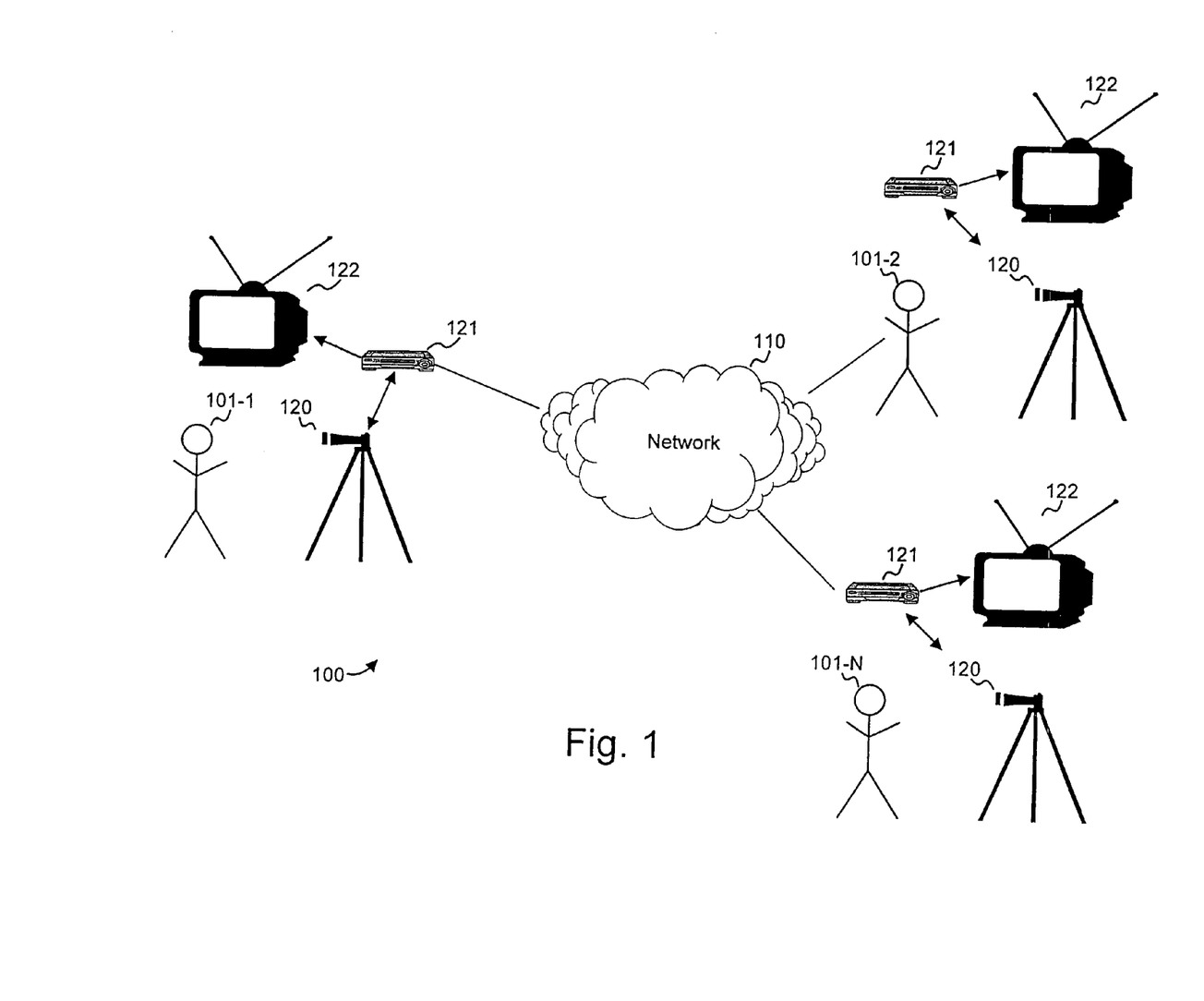
FIG. 1 is a diagram illustrating an exemplary video conferencing system.

FIG. 1 is a diagram illustrating an exemplary video conferencing system 100. Users 101-1 through 101-N (collectively users 101) may use system 100 to videoconference with one another. Network 110 couples users 101 and 102 with one another. Video streams created by users 101 may be transmitted over network 110. Network 110 may be a private network or a public network such as the Internet.

For a particular user 101, system 100 may include a video capture device 120, a personal multimedia device 121, and a television 122. Video capture device 120 may be, for example, a conventional video camera. Television 122 presents the video and audio signals transmitted from user 102 via network 110. Television 122 may alternatively be implemented as other types of multimedia presentation devices, such as a computer monitor and speakers.

Personal multimedia device 121 is connected to network 110. Personal multimedia device 121 is also connected to receive the video signals from video capture device 120 and to output television compatible video signals to television 122.

Consistent with an aspect of the invention, personal multimedia device 121 may be programmed to convert between different video formats native to different ones of televisions 122. For example, video capture device 121 of user 101-1 may output PAL formatted signals and television 122 of user 101-2 may be a NTSC standard television. In this situation, personal multimedia device 121 of user 101-2 may convert the video signal transmitted over network 110 into an NTSC compatible television before outputting the signal to television 122 of user 101-2.

In one implementation, personal multimedia device 121 is a set-top box. Accordingly, personal multimedia device 121 may alternatively be referred to herein as set-top box 121.

Set-Top Box Overview

Figure 2:
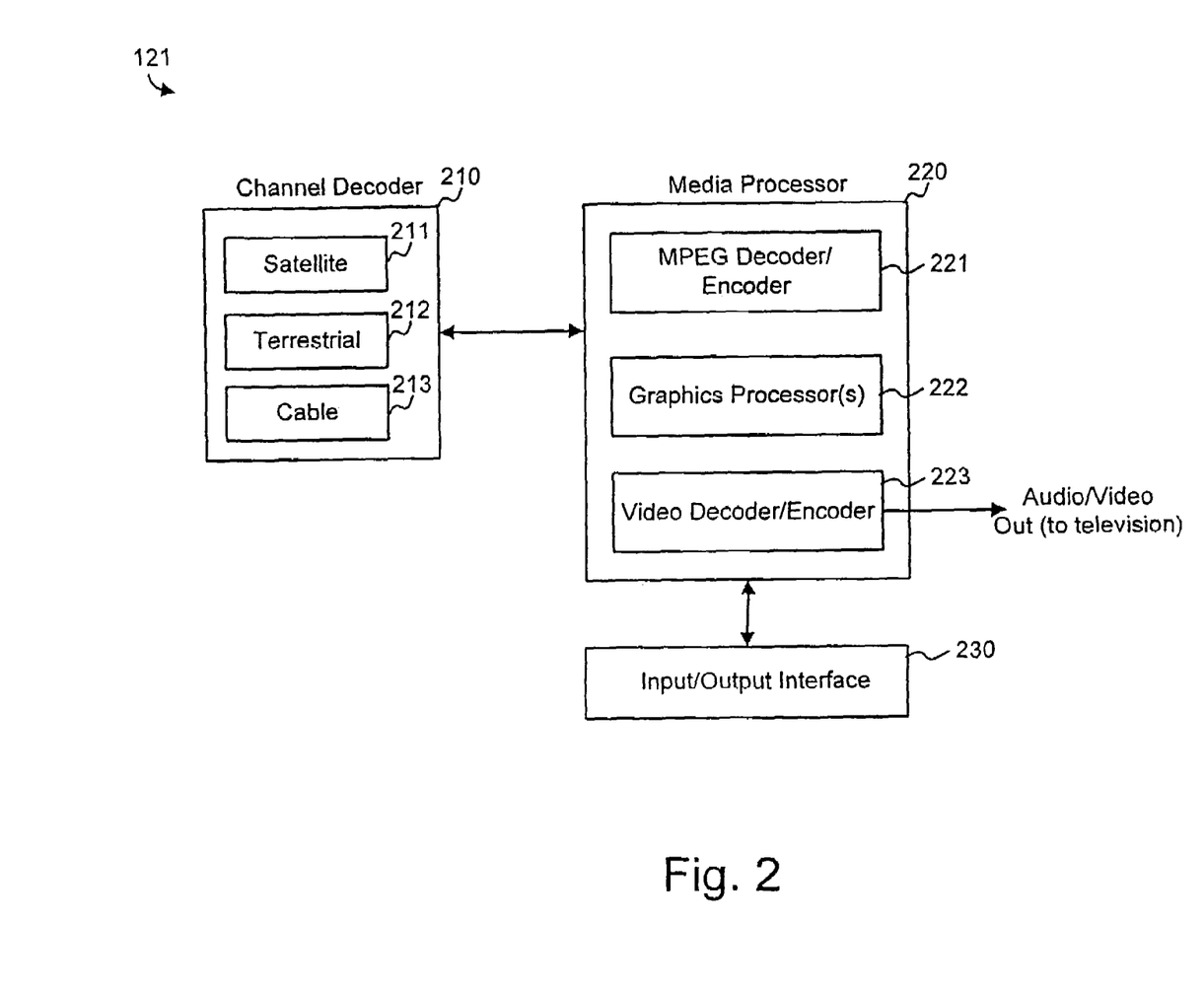
FIG. 2 is a diagram illustrating functional components of a set-top box.

FIG. 2 is a diagram illustrating functional components of a set-top box, such as set-top box 121. Three functional components are shown in FIG. 2 for simplicity: channel decoder 210, media processor 220, and input/output interface 230.

Video signals may be received by set-top box 121 at channel decoder 210. Depending on the type of set-top box, channel decoder 210 may include one or more of satellite transceiver 211, terrestrial decoder 212, and cable transceiver 213. Satellite transceiver 211 may be designed to receive television signals broadcast from a satellite. Satellite transceiver 211 may thus include one or more conventional directional antennas (not shown) capable of transmitting/receiving signals via radio frequency waves. Satellite transceiver 211 may convert the received signals to digital signals using conventional techniques and transmit the converted signals to media processor 220.

Terrestrial decoder 212 may include logic for receiving and processing conventional broadcast television signals. Terrestrial decoder 212 may include, for example, an omni-directional antenna (not shown) and circuitry for processing television signals received over the omni-directional antenna. A digital signal resulting from the processing from terrestrial decoder 212 may be output to media processor 220.

Cable transceiver 213 receives signals transmitted over a cable system, such as an optical or coaxial cable system, and converts the signals into a digital signal. Media processor 220 receives the signals from channel decoder 210 and processes the signals into a form suitable for viewing on television 122. Media processor 220 may include a number of functional components, such as MPEG decoder/encoder 221, graphics processor(s) 222, and video encoders/decoders 223.

MPEG decoder/encoder 221 may perform encoding and decoding functions relating to the Moving Picture Experts Group (MPEG) family of standards. The MPEG standards are used for coding audio-visual information in a digital compressed form. Because MPEG video streams are compressed, they can be transmitted with significantly less bandwidth than uncompressed streams. Multiple versions of the MPEG standard exist, such as the MPEG-2 and MPEG-4 standards. MPEG decoders/encoders are known in the art and will not be described further herein.

Graphics processor(s) 222 perform image-processing functions on an uncompressed image. Graphics processor(s) 222 may, for example, scale an image, manipulate the color in the image, or superimpose text or graphics on an image. Graphics processors are generally known in the art and are frequently implemented using custom semiconductor chips designed to efficiently perform graphic functions.

Video decoder/encoder 223 may be configured to convert uncompressed video streams into analog television signals. Video decoder/encoder 223 can be, for example, a PAL or NTSC decoder/encoder that contains logic to convert video signals to one or both of these standards. Video decoders/encoders are generally well known in the art.

Input/output interface 230 may include logic for connecting additional devices to set-top box 121. Input/output interface 230 may include network ports, such as an Ethernet port, keyboard and mouse ports, USB ports, etc. Through input/output interface 230, set-top box 121 can provide personal computer-like functions. In particular, through a network port such as an Ethernet port, set-top box 121 may connect and communicate with other devices, including other set-top boxes coupled to network 110. Two set-top boxes may, for example, exchange MPEG video streams over network 110.

The components illustrated in FIG. 2 are functional components useful in explaining the present invention. Actual set-top boxes may contain many additional components. Also, in actual set-top boxes, multiple ones of the components shown in FIG. 2 may be implemented as a single physical device or conversely, multiple physical devices may be used to implement one of the functional components shown in FIG. 2. It should also be understood that the components illustrated in FIG. 2 may be implemented in hardware, software, or any combination of hardware and software.

In alternate implementations, instead of using the MPEG family of compression standards, other compression standards, such as H.261, H.263, or H.264 may be used. In general, the H.261, H.263, and H.264 compression standards use best effort to achieve a frame rate of 15 or 30 frames-per-second.

Set-Top Box Operation

As discussed above, video or television signals may be implemented in one of a number of different formats. The PAL standard, for example, has a line resolution of 625 lines per frame and is displayed at 25 frames-per-second (fps). The NTSC standard has a line resolution of 525 lines per frame and is displayed at 29.97 fps.

Figure 3:
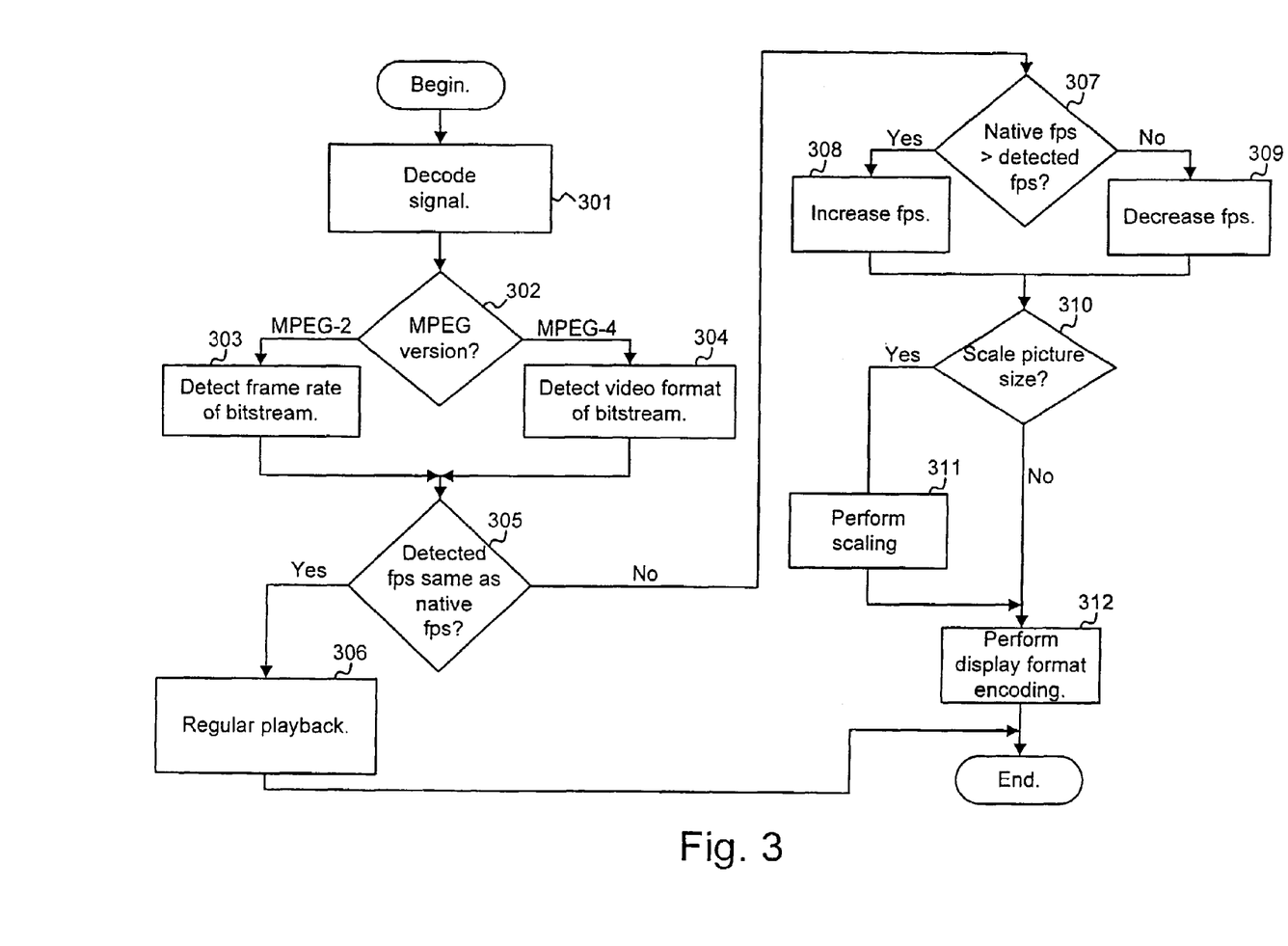
FIG. 3 is a flow chart illustrating operation of set-top box in performing video format conversions consistent with aspects of the invention.

Set-top boxes 121 will generally be programmed to output a "native" format that is common to the region in which the set-top box is used. Consistent with an aspect of the invention, media processor 220 converts between incoming video formats and the native format of set-top box 121. The conversion is performed using hardware that is conventionally available in many set-top boxes, and can thus be implemented in set-top box 121 with relatively little incremental cost. FIG. 3 is a flow chart illustrating operation of set-top box 121 in performing such conversions.

Incoming video signals may be processed by channel decoder 210 (Act 301). The output of channel decoder 210 may be a digital version of the video signal. The video signal may be compressed using a video compression standard such as MPEG-2 or MPEG-4. The MPEG bit stream may be decoded by MPEG decoder/encoder 221 to produce a non-compressed video signal in a format such as PAL or NTSC. Alternatively, the incoming video signals may be received as a digital video bit stream (e.g., as an MPEG bit stream) over network 110 by input/output interface 230. In this situation, the digital video stream may be transmitted directly to media processor 220.

Information relating to the format of a video signal, such as the frame rate, may be embedded in fields associated with the MPEG bit stream. Media processor 220 may examine fields in the MPEG video stream to determine the format, such as the frame rate and resolution of the video signal. In one implementation, the video signal is compressed using either the MPEG-2 or MPEG-4 standard. Media processor 220 may examine the MPEG bit stream to determine the appropriate MPEG version (Act 302). The information is contained in header fields present in the MPEG bit stream.

Based on the MPEG version determined in Act 302, media processor 220 determines the format of the video signal (Acts 303 and 304). For MPEG-2 video streams, the frame rate is described in a four-bit "frame rate" field. Also, under MPEG-2, a three-bit "video format" field describes the video format encoded in the MPEG bit stream. Table I and II, below, describe the meaning for various values in the "frame rate" and "video format" fields under MPEG-2.

TABLE I

MPEG-2 Frame Rate Field

| Frame Rate Code | Frame Rate Value |
|---|---|
| 0000 | Forbidden |
| 0001 | 24.000 ÷ 1.001 (23.976) |
| 0010 | 24 |
| 0011 | 25 |
| 0100 | 30.000 ÷ 1.001 (29.97) |
| 0101 | 30 |
| 0110 | 50 |
| 0111 | 60.000 ÷ 1.001 (59.94) |
| 1000 | 60 |
| 1001 | Reserved |
| ... | ... |
| 1111 | Reserved |

TABLE II

MPEG-2 Video Format Field

| Video Format Code | Meaning |
|---|---|
| 000 | Component |
| 001 | PAL |
| 010 | NTSC |
| 011 | SECAM (Systeme Electronique Couleur Avec Memoire) |
| 100 | MAC |
| 101 | Unspecified video format |
| 110 | Reserved |
| 111 | Reserved |

Thus, for MPEG-2 bit streams, media processor 220 may use either the frame rate field to infer the format of the video stream or the video format field to directly determine the format of the video stream (Act 303). As an example of inferring the format of a video stream, consider the situation in which the frame rate is 29.97 fps. This frame rate corresponds to an NTSC video signal.

MPEG-4 video streams include a video format field similar to the video format field contained in MPEG-2 video streams. Accordingly, for MPEG-4 video streams, the video format field can be used to determine the format, and hence the frame rate, of the video stream (Act 304).

If the frame rate of the format detected in Acts 303 and 304 is the same as the native format of set-top box 121, the received video stream can be played back by set-top box 121 without conversion (Acts 305 and 306). In this situation, MPEG decoder/encoder 221 may decode the MPEG video stream to an uncompressed version, which may then be converted directly to the appropriate analog output format by video decoder/encoder 223.

When, however, the frame rate of the format detected in Acts 303 and 304 is different than the native format of set-top box 121, media processor 220 determines whether the native format has more frames-per-second than the native format (Act 307). If the native format has more frames-per-second than the detected format, media processing component 220 increases the frames-per-second of the detected video signal (Act 308).

Figure 4:
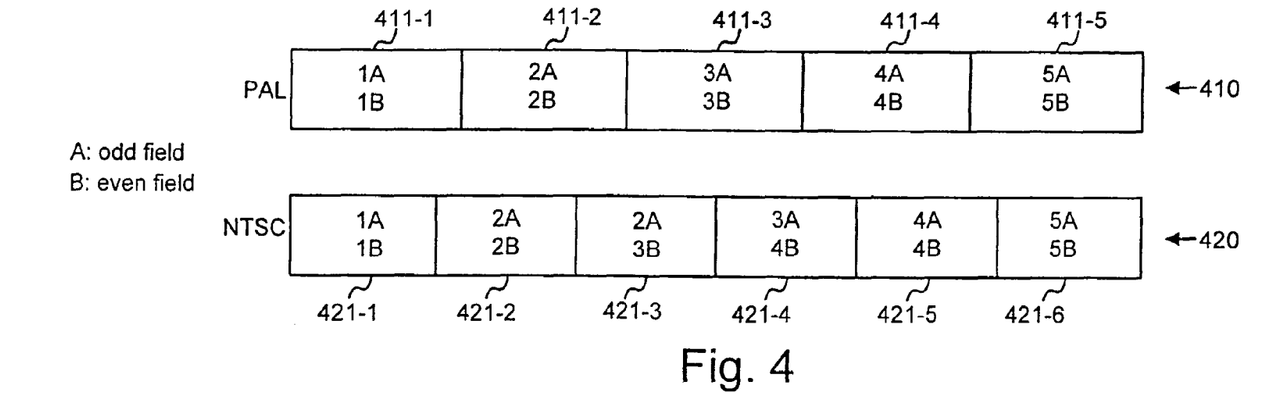
FIG. 4 is a diagram illustrating increasing the frames-per-second of a detected video signal.

FIG. 4 is a diagram illustrating increasing the frames-per-second of the detected video signal as performed in Act 308. The video signal may first be decoded by MPEG decoder/encoder 221 to obtain an uncompressed version of the video signal. Assume that for this example, the detected video format is PAL (25 fps) and the native video format is NTSC (29.97 fps).

In FIG. 4, a PAL video signal 410 is represented as a number of frames 411-1 through 411-5. Although only five frames are shown in FIG. 4, in practice, the process shown for the five frames in FIG. 4 may be repeated for each set of five frames in the video signal. PAL video signals are in an interlaced format. In an interlaced video signal, each frame is rendered in two successive sweeps. Thus, for example, with a PAL frame that includes 625 lines, the odd lines of the frame may be rendered first followed by the even lines. In this manner, when rendering the frame, the television interlaces the odd and even portions of the frame. The odd and even interlaced portions of frames 411 are indicated in FIG. 4 with "A" for the odd fields and "B" for the even fields.

The target video format, an NTSC signal, is illustrated in FIG. 4 as video signal 420. Video signal 420 includes six frames 421-1 through 421-6. Thus, as shown in this figure, the five frames in PAL video signal 410 are converted into NTSC video signal 420 containing six NTSC frames 421.

The first frame of NTSC video signal 420, frame 421-1, is formed from the odd and even portions of the first frame of PAL video signal 410, frame 411-1. That is, frame 421-1 is essentially the same as frame 411-1, although frame 421-1 is associated with a shorter time duration. Similarly, frame 421-2 is formed from the odd and even portions of frame 411-2. Frame 421-3, however, is formed from the odd portion of frame 411-2 and the even portion of 411-3. Frame 421-4 is formed from the odd portion of frame 411-3 and the even portion of 411-4. Frame 421-5 is formed from the odd and even portions of frame 411-4. Frame 421-6 is formed from the odd and even portions of frame 411-5.

In the operations shown in FIG. 4, five PAL formatted frames are converted to six NTSC formatted frames. A pure five-to-six conversion would actually produce 30.00 NTSC fps instead of the required 29.97 fps. To correct this, MPEG decoder/encoder 221 may additionally multiply the converted 30.00 fps signal by 0.999 to obtain a 29.97 fps video signal. One way of physically implementing the multiply operation is by dropping a frame every 1001 frames.

Figure 5:
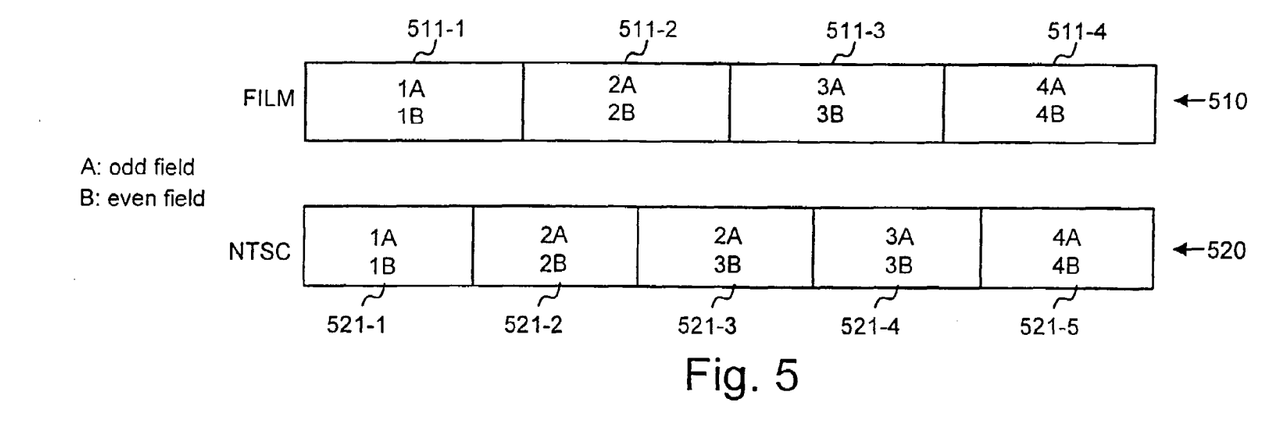
FIG. 5 is a diagram illustrating an alternate implementation for increasing the frames-per-second of a detected video signal.

FIG. 5 is a diagram illustrating another implementation of Act 308. In this example, a FILM formatted video signal is converted to an NTSC formatted video signal. The FILM format is a 24 fps format compared to the 29.97 fps format of NTSC.

FILM video signal 510 is represented as a number of frames 511-1 through 511-4. Although only four frames are shown in FIG. 5, in practice, the process shown for the four frames in FIG. 5 may be repeated for each set of four frames in the video signal. The target video format, an NTSC signal, is illustrated as video signal 520. Video signal 520 includes frames 521-1 through 521 -5.

As shown in FIG. 5, the first frame of NTSC video signal 520, frame 521 -1, is formed from the odd and even portions of the first frame of FILM video signal 510, frame 511-1. Similarly, frame 521-2 is formed from the odd and even portions of frame 511-2. Frame 521-3, however, is formed from the odd portion of frame 511-2 and the even portion of 511-3. Frame 521-4 is formed from the odd and even portions of frame 511-3. Frame 521-5 is formed from the odd and even portions of frame 511-4.

Referring back to FIG. 3, when the frame rate of the format detected in Act 307 is different than the native format of set-top box 121, and the native format has less frames-per-second than the detected format, media processing component 220 decreases the frames-per-second of the detected video signal (Act 309).

Figure 6:
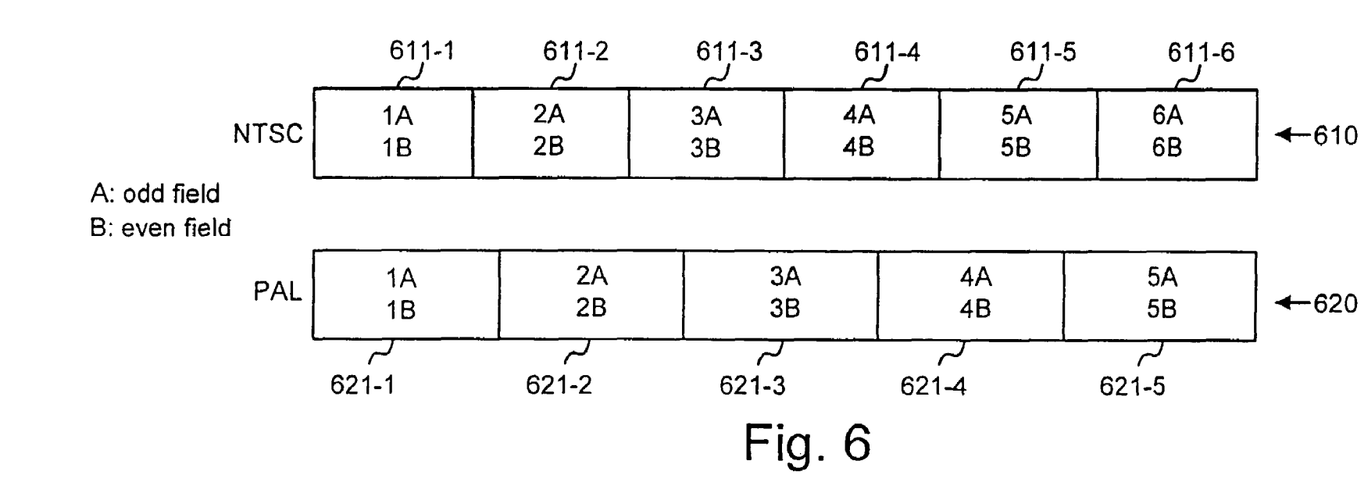
FIG. 6 is a diagram illustrating decreasing the frames-per-second of a detected video signal.

FIG. 6 is a diagram illustrating decreasing the frames-per-second of the detected video signal as performed in Act 309. Assume that for this example, the detected video format is NTSC (29.97 fps) and the native video format is PAL (25 fps). In this situation, media processor 220 occasionally drops frames to reduce the frames-per-second. For most applications, an occasional dropped frame will not be noticed when converting from NTSC to PAL video formats.

In FIG. 6, a NTSC video signal 610 is represented as a number of frames 611-1 through 611-6. The target video format, a PAL signal, is illustrated in FIG. 6 as video signal 620. Video signal 620 includes five frames 621-1 through 621-5. Thus, as shown in this figure, the six frames in NTSC video signal 610 are converted into PAL video signal 620 containing five PAL frames 620. The conversion is formed by copying, on a one-to-one basis, frames 611-1 to 611-5 to frames 621-1 to 621-5, respectively. Frame 611-6 is dropped.

A straight six-to-five frame conversion from NTSC would actually yield a video signal at 24.975 fps. Accordingly, MPEG decoder/encoder 221 may additionally divide the PAL video signal 620 by 0.999 to achieve 25 fps. In practice, the divide operation may be performed by occasionally adding a duplicate frame to the signal.

FIGS. 4-6 illustrate frame rate conversion for video signals having interlaced formats. For video formats having progressive (non-interlaced) frames, increasing or decreasing the fps of the video signal reduces to a simple mathematical relation of dropping/repeating X frame(s) every Y frames(s). Thus, for example, if a first progressive video format having 10 fps is to be converted to a second video format having 15 fps, every other frame in the first video format could be repeated to form the second video format.

The techniques shown in FIGS. 4-6 do not impact lip-sync because the Audio Presentation Time Stamp (PTS) does not change. Accordingly, these techniques do not require modification of the audio stream corresponding to the video signal.

Referring back to FIG. 3, graphics processor(s) 222 may rescale the picture size by scaling the resolution of each of the frames. In particular, if the detected frame size and the native frame size are not the same, (Act 310), graphic(s) processor (s) 222 may rescale the frame size so that the converted video signal has the correct frame size (Act 311). In the case of PAL to NTSC conversion, graphics processor(s) 222 scales the vertical scale by a factor of 0.84. Conversely, for NTSC to PAL conversion, graphics processor(s) 222 stretches the vertical scale by a factor of 1.19 (1/0.84). Alternatively, black bars can be inserted if it is desirable to maintain the aspect ratio.

Video decoder/encoder 223 may next process the converted video signal into an analog format appropriate for television 122 (Act 312). Video decoder/encoder 223 may, for example, add the frame timing information required by the particular video format.

The above-discussed implementations perform frame rate conversion using relatively simple frame add/drop techniques for increasing/decreasing frame rate. In other implementations, set-top box 121 may implement more complicated image conversion techniques. For example, set-top box may perform temporal filtering and image sharpening to more optimally convert video signals.

Figure 7:
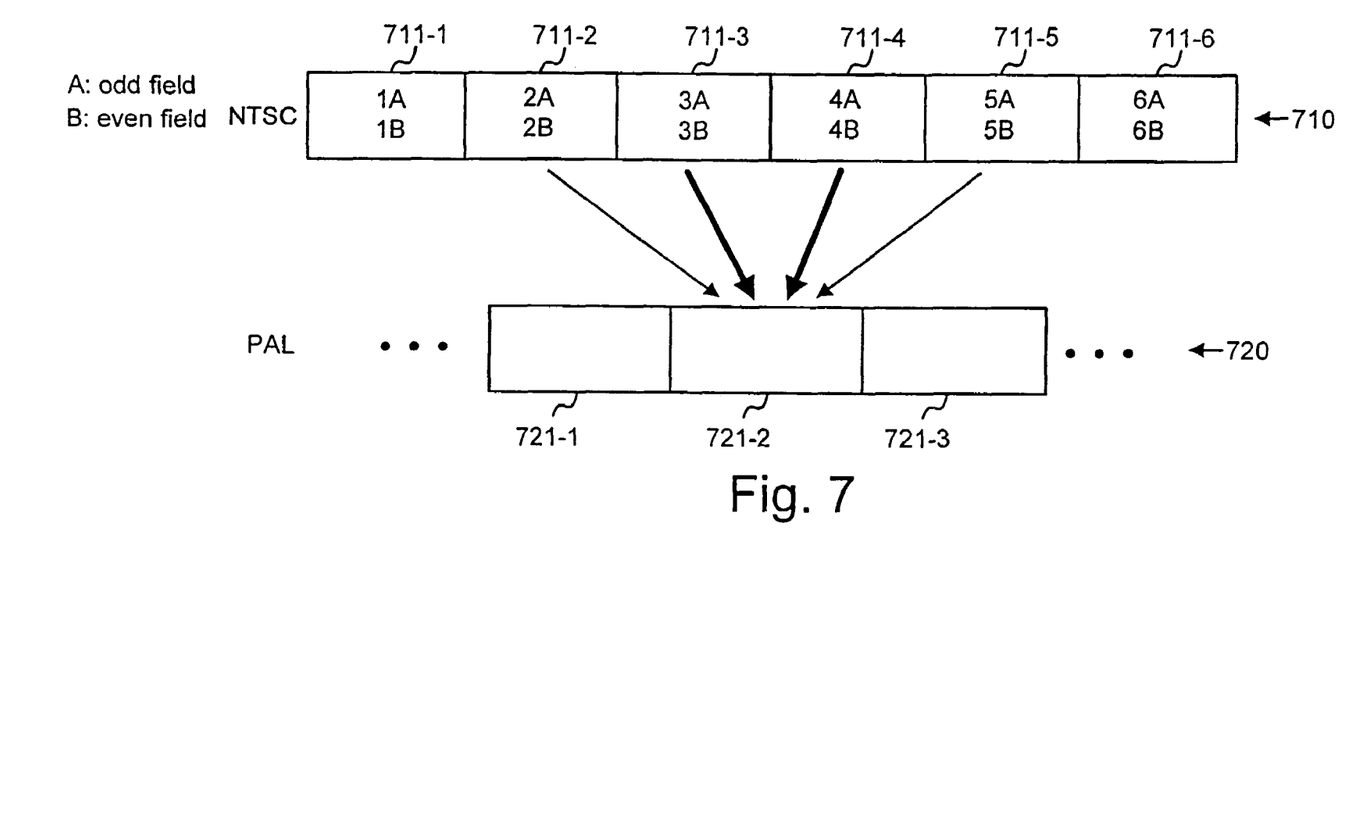
FIG. 7 is a diagram illustrating temporal filtering and sharpening.

FIG. 7 is a diagram illustrating interpolation through temporal filtering in additional detail for an exemplary NTSC to PAL conversion. NTSC video signal 710 include six frames 711-1 through 711-76. Instead of simply dropping every sixth frame as described above with reference to FIG. 6, frames may be temporarily filtered and sharpened in a more optimal (although potentially more processor/memory resource intensive) manner. Thus, target frame 721-2, for example, may be formed as a combination of the information in frames 711-3 and 711-4, or even as a combination of the information in frames 711-2 through 711-5.

Video Conferencing

Figure 8:
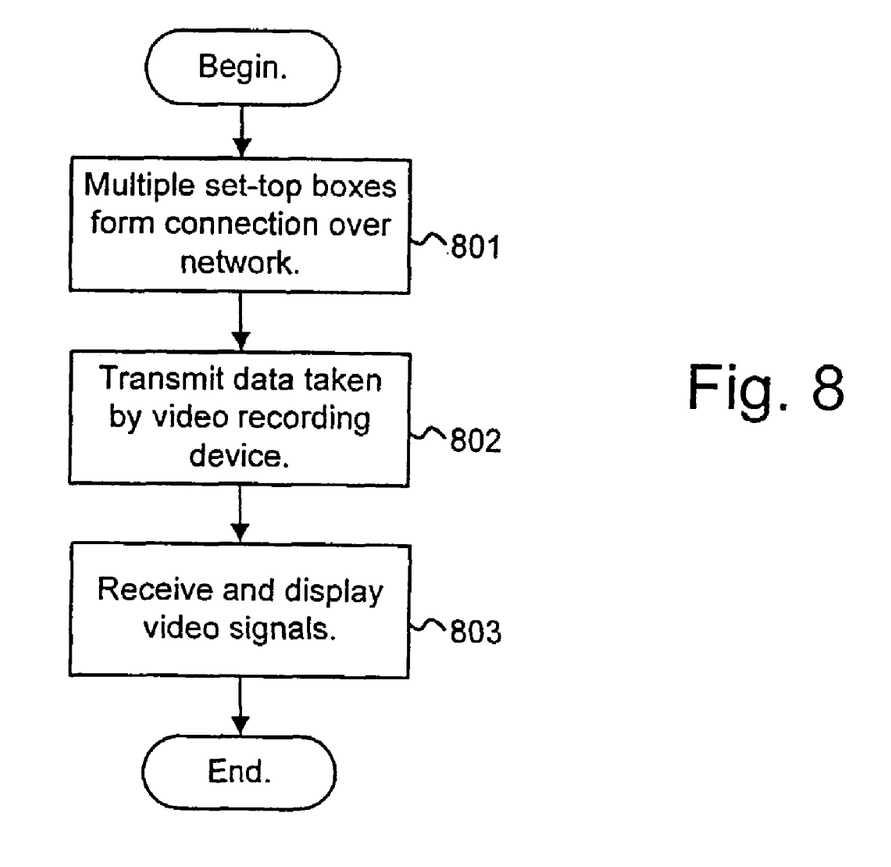
FIG. 8 is a flow chart illustrating methods performed in a videoconference established consistent with aspects of the invention.

As previously mentioned, one application of the above-described video format conversion performed by set-top box 121 is videoconferencing. FIG. 8 is a flow chart illustrating methods performed in a videoconference established in a manner consistent with aspects of the invention.

To begin, two or more set-top boxes may communicate with one another over network 110 to form a network connection (Act 801). For example, user 101-1 may form a video conference connection with users 101-2 and 101-3. In some implementations, devices other than set-top boxes 121 may also participate in the videoconference. For example, a set-top box may communicate with a personal computer to establish a videoconference.

During the videoconference, data received the video capture device 120 associated with set-top boxes 121 is transmitted over network 110 (Act 802). The video will generally be transmitted at the frame rate and resolution native to the transmitting set-top box or video capture device. Set-top boxes 121 also receive and display video signals over network 110 (Act 803). Video signals that are not in the native format of the set-top box are converted as described above. As described above, a video signal can be converted to the appropriate video signal format on-the-fly, without having to pre-negotiate a particular video standard to use in the video conference. Thus, each of the participants of the video conference could potentially be using a different native video standard, yet the video conference could still proceed without having to first negotiate a common standard. Relative to the centralized format decisions common in broadcast television, the format decision is made in a distributed manner.

In the videoconferencing application described above, a standard set-top box may be used to implement videoconferencing with videoconference partners that transmit video in a format different than the native format of the set-top box.

CONCLUSION

Techniques described herein provide for conversion between video formats at a personal multimedia device using existing hardware in the personal multimedia device.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, devices other than traditional set-top boxes may be used to convert between video formats. Video game consoles, for example, may be used to implement video conferences consistent with aspects of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A personal multimedia device comprising:
    a set-top box for receiving digital television signals, wherein the received digital television signal is independent of a native display format of the personal multimedia device and received in a format incompatible with a direct display of the received digital television signal on any monitor, the monitor being exterior to the personal multimedia device, wherein the set-top box comprises:
        a media processing component, internal to the set-top box, configured to:
            decode the received television signal into at least a first field and a received video signal;
            detect a frame rate of the received video signal;
            compare the frame rate to a frame rate native to the personal multimedia device, the frame rate native to the personal multimedia device determined by a region where the personal multimedia device is located;
            increase a frame rate of the received video signal when the frame rate of the received video signal is less than the frame rate native to the personal multimedia device by adding frames to the received video signal where the added frames are based on at least one of the received frames, and
            decrease the frame rate of the received video signal when the frame rate of the received video signal is greater than the frame rate native to the personal multimedia device by removing at least one frame without modifying any frame adjacent to the removed frame from the received video signal.

2. The personal multimedia device of claim 1, wherein the media processing component further includes at least one graphics processor configured to scale a frame resolution of frames in the received video signal to correspond to a native video format of the personal multimedia device.

3. The personal multimedia device of claim 1, wherein each of the added frames are derived from an odd field of a first frame of the received video signal and an even field of a second frame of the received video signal.

4. The personal multimedia device of claim 1, wherein when the received video signal is a Phase Alternation Line (PAL) formatted video signal and the native video format is a National Television Systems Committee (NTSC) formatted video signal, the media processing component adds one frame for every five received frames.

5. The personal multimedia device of claim 1, wherein when the received video signal is a National Television Systems Committee (NTSC) formatted video signal and the native video format is a Phase Alternation Line (PAL) formatted video signal, the media processing component removes one frame for every six received frames.

6. The personal multimedia device of claim 1, wherein when the received video signal is a FILM formatted video signal and the native video format is a National Television Systems Committee (NTSC) formatted video signal, the media processing component adds one frame for every four received frames.

7. The personal multimedia device of claim 1, wherein the media processing component further includes:
    a video decoder/encoder configured to process the scaled video signal to an analog format appropriate for display on a television using the native video format of the personal multimedia device.

8. The personal multimedia device of claim 1, further comprising:
    a channel decoder configured to decode television signals; and
    an input/output interface including logic configured to connect external devices to the personal multimedia device.

9. The personal multimedia device of claim 1, wherein the media processing component determines the frame rate of the received video signal by examining header fields in a compressed version of the received video signal.

10. The personal multimedia device of claim 9, wherein the compressed version of the received video signal is compressed based on one of MPEG-2, MPEG-4, H.261, H.263, or H.264 standards.

11. A personal multimedia device comprising:
a set-top box for receiving digital television signals, wherein the received digital television signal is independent of a native display format of the personal multimedia device and received in a format incompatible with a direct display of the received digital television signal on any monitor, the monitor being external to the personal multimedia device, wherein the set-top box comprises:
a media processing component, internal to the set-top box, configured to:
decode the received television signal into at least a first field and a received video signal;
detect a frame rate of the received video signal;
compare the frame rate to a frame rate native to the personal multimedia device, the frame rate native to the personal multimedia device determined by a region where the personal multimedia device is located; and
modify a frame rate of the received video signal when the frame rate of the received video signal is different than the frame rate native to the personal multimedia device by temporally filtering the sequences of frames in the received video signal to derive a new set of interpolated frames at the frame rate native to the personal multimedia device, and removing a frame from the received video signal when the frame rate of the personal multimedia device is less than the frame rate of the received video signal without modifying any frame adjacent to the removed frame,
wherein the media processing component further includes at least one graphics processor configured to scale a frame resolution of frames in the received video signal to correspond to a native video format of the personal multimedia device.

12. The personal multimedia device of claim 11, wherein the media processing component further includes:
a video decoder/encoder configured to process the scaled video signal to an analog format appropriate for display on a television using the native video format of the personal multimedia device.

13. The personal multimedia device of claim 11, further comprising:
a channel decoder configured to decode television signals; and
an input/output interface including logic configured to connect external devices to the personal multimedia device.

14. A method for converting a compressed video signal in a first format to a second format the method comprising:
determining a frame rate of the compressed video signal in the first format, wherein the first format is independent of a native display format of a converter and incompatible with a direct display of the video signal on any monitor external to the converter, based on header information included in the compressed video signal;
decoding the compressed video signal to uncompress the video signal within the converter;
increasing the frame rate of the video signal in the first format within the converter when the determined frame rate is less than a frame rate of the second format, the frame rate of the second format determined by a geographic region;
by adding frames to the uncompressed video signal of the first format, where each added frame is based on at least one frame in the uncompressed video signal in the first format;
decreasing the frame rate of the video signal in the first format within the converter when the determined frame rate is greater than the frame rate of the second format by removing frames from the uncompressed video signal in the first format without modifying any frame adjacent to the removed frames; and
scaling a frame resolution of each of the frames of the video signal in the first format within the converter to adjust a resolution of the video signal in the first format to match a resolution of the video signal in the second format.

15. The method of claim 14, wherein each of the added frames are derived from an odd field of a first frame of the video signal in the first format and an even field of a second frame of the video signal in the second format.

16. The method of claim 14, wherein when the video signal in the first format is a Phase Alternation Line (PAL) formatted video signal and the video signal in the second format is a National Television Systems Committee (NTSC) formatted video signal, increasing the frame rate includes adding one frame for every five received frames.

17. The method of claim 14, wherein when the video signal in the first format is a National Television Systems Committee (NTSC) formatted video signal and the video signal in the second format is a Phase Alternation Line (PAL) formatted video signal decreasing the frame rate includes removing one frame for every six received frames.

18. The method of claim 14, wherein when the video signal in the first format is a FILM formatted video signal and the video signal in the second format is a National Television Systems Committee (NTSC) formatted video signal increasing the frame rate includes adding one additional frame for every four received frames.

19. The method of claim 14, wherein determining a frame rate comprises:
determining the frame rate of the video signal in the first format by examining header fields in the compressed video signal in the first format.

20. The method of claim 19, wherein the compressed video signal in the first format is compressed based on one of MPEG-2, MPEG-4, H.261, H.263, and H.264 standards.

21. A video conference system comprising:
a first personal multimedia device for receiving digital television signals, the received digital television signal is independent of a native display format of the first personal multimedia device and received in a format incompatible with a direct display of the received digital television signal on any monitor, the monitor being external to the first personal multimedia device, further configured to output video signals in a first format, the first format determined by a region where the first personal multimedia device is located, and to convert received video signals that are not in the first format to television compatible video signals in the first format;
a first video capture device coupled to the first personal multimedia device and configured to transmit video signals to the first personal multimedia device;
a second personal multimedia device coupled to the first personal multimedia device via a network, the second personal multimedia device configured to output video signals in a second format, the second format determined by a region where the second personal multimedia device is located;

and to convert received video signals that are not in the second format to television compatible video signals in the second format; and a second video capture device coupled to the second personal multimedia device and configured to transmit video signals to the second personal multimedia device; and a media processing component, internal to the first personal multimedia device, configured to:

increase a frame rate of a received video signal when the frame rate of the received video signal is less than a frame rate of a native video format of the first personal multimedia device by adding frames to the received video signal where the added frames are based on at least one of the received frames, and decrease the frame rate of the received video signal when the frame rate of the received video signal is greater than a native frame rate of the first personal multimedia device by removing frames from the received video signal, wherein the media processing component further includes at least one graphics processor configured to scale a frame resolution of the frames in the received video signal to correspond to the native video format of the first personal multimedia device without modifying any frame adjacent to the removed frames.

22. The video conference system of claim 21, further comprising:

a third personal multimedia device coupled to the first personal multimedia device and the second personal multimedia device via the network, the third personal multimedia device configured to convert the received video signal to a third format when the native format is different from the first and second formats.

23. The system of claim 21, wherein the first and second personal multimedia devices are set-top boxes.

24. The video conference system of claim 21, wherein each of the added frames are derived from an odd field of a first frame of the received video signal and an even field of a second frame of the received video signal.

25. The video conference system of claim 21, wherein when the received video signal is a Phase Alternation Line (PAL) formatted video signal and the native video format is a National Television Systems Committee (NTSC) formatted video signal, the media processing component adds one frame for every five received frames.

26. The video conference system of claim 21, wherein when the received video signal is a National Television Systems Committee (NTSC) formatted video signal and the native video format is a Phase Alternation Line (PAL) formatted video signal, the media processing component removes one frame for every six received frames.

27. The video conference system of claim 21, wherein when the received video signal is a FILM formatted video signal and the native video format is a National Television Systems Committee (NTSC) formatted video signal, the media processing component adds one additional frame for every four received frames.

28. A device, receiving digital television signals, for converting a video signal in a first format to a second format, the second format determined by a region where the device is located, the device comprising:

means for receiving the received digital television signals independent of a native display format of the device and in a format incompatible with a direct display of the received digital television signals on any monitor, the monitor being external to the device;

means for decoding the received television signals into at least a first field and a received video signal;

means for determining a frame rate of the video signal in the first format based on at least the first field of the received television signals;

means, included in the device, for increasing the frame rate when the determined frame rate is less than a frame rate of the second format by adding frames to the video signal of the first format, where each added frame is based on at least one frame in the video signal in the first format;

means, included in the device, for decreasing the frame rate when the determined frame rate is greater than the frame rate of the second format by removing frames from the video signal in the first format without modifying any frame adjacent to the removed frames; and means, included in the device, for scaling a frame resolution of each of the frames of the video signal in the first format to adjust a resolution of the video signal in the first format to match a resolution of the video signal in the second format.

29. The device of claim 28, wherein the device is a set-top box.

* * * * *